(12) United States Patent
Tsuchiya (10) Patent No.: US 7,663,716 B2
(45) Date of Patent: Feb. 16, 2010

(54) LIQUID CRYSTAL DISPLAY DEVICE AND ELECTRONIC APPARATUS

(75) Inventor: Hitoshi Tsuchiya, Nagano (JP)

(73) Assignee: Seiko Epson Corporation (JP)

( * ) Notice: Subject to any disclaimer, the term of this patent is extended or adjusted under 35 U.S.C. 154(b) by 610 days.

(21) Appl. No.: 11/210,007

(22) Filed: Aug. 23, 2005

(65) Prior Publication Data

US 2006/0044496 A1  Mar. 2, 2006

(30) Foreign Application Priority Data

Sep. 1, 2004  (JP) ............................. 2004-253845

(51) Int. Cl.
  *G02F 1/1335* (2006.01)
  *G02F 1/1337* (2006.01)
  *G02F 1/1343* (2006.01)

(52) U.S. Cl. ........................ 349/114; 349/129; 349/107; 349/146

(58) Field of Classification Search .................. 349/114
  See application file for complete search history.

(56) References Cited

U.S. PATENT DOCUMENTS

| 6,654,076 | B2 | 11/2003 | Ha |
| 6,710,827 | B2 | 3/2004 | Kubo |
| 6,757,038 | B2 * | 6/2004 | Itoh et al. ................... 349/113 |
| 6,927,817 | B2 | 8/2005 | Itoh et al. |
| 6,956,632 | B2 | 10/2005 | Ozawa |
| 7,088,407 | B2 | 8/2006 | Takizawa |
| 7,102,714 | B2 | 9/2006 | Tsuchiya |
| 7,106,400 | B1 | 9/2006 | Tsuda |
| 7,298,430 | B2 | 11/2007 | Nishino et al. |
| 2004/0032550 | A1 | 2/2004 | Anno |
| 2004/0041957 | A1 | 3/2004 | Yamaguchi |

(Continued)

FOREIGN PATENT DOCUMENTS

JP         11-242226          9/1999

(Continued)

OTHER PUBLICATIONS

Machine Translated JP2004-093780A.*

(Continued)

*Primary Examiner*—David Nelms
*Assistant Examiner*—W. Patty Chen
(74) *Attorney, Agent, or Firm*—Harness, Dickey & Pierce, P.L.C.

(57) ABSTRACT

A liquid crystal display device includes a first substrate, a second substrate, and a liquid crystal layer interposed between the first substrate and the second substrate, the liquid crystal display device having a dot region as an image display unit, the dot region including a transmissive display region and a reflective display region, wherein a thickness adjustment layer for adjusting the thickness of the liquid crystal layer is disposed between the liquid crystal layer and at least one of the first substrate and the second substrate, the thickness adjustment layer decreasing the thickness of the liquid crystal layer in the reflective display region compared with the thickness of the liquid crystal layer in the transmissive display region, and a metal line is placed on the second substrate so as to overlap, in plan view, an inclined region of the thickness adjustment layer disposed between the transmissive display region and the reflective display region.

7 Claims, 4 Drawing Sheets

U.S. PATENT DOCUMENTS

| | | |
|---|---|---|
| 2004/0061816 A1 | 4/2004 | Tsuchiya |
| 2004/0160552 A1* | 8/2004 | Takizawa et al. ............ 349/107 |
| 2004/0201802 A1* | 10/2004 | Ha et al. .................... 349/114 |
| 2006/0050210 A1* | 3/2006 | Tsuchiya .................... 349/114 |
| 2007/0052890 A1* | 3/2007 | Sakai ......................... 349/114 |

FOREIGN PATENT DOCUMENTS

| | | |
|---|---|---|
| JP | 2000-171793 | 6/2000 |
| JP | 2000-171794 | 6/2000 |
| JP | 2001-343660 | 12/2001 |
| JP | 2003-140190 | 5/2003 |
| JP | 2003-270628 | 9/2003 |
| JP | 2003-279959 | 10/2003 |
| JP | 2003-287762 | 10/2003 |
| JP | 2004-20907 | 1/2004 |
| JP | 2004-61952 | 2/2004 |
| JP | 2004-085918 | 3/2004 |
| JP | 2004-093780 | 3/2004 |
| JP | 2004-093781 | 3/2004 |
| JP | 2004-109597 | 4/2004 |
| JP | 2004-109777 | 4/2004 |
| JP | 2004-157273 | 6/2004 |
| JP | 2004-191575 | 7/2004 |
| JP | 2004-219996 | 8/2004 |
| JP | 2004-240268 | 8/2004 |
| JP | 2004-326715 | 11/2004 |

OTHER PUBLICATIONS

Makoto Jisaki, et al., "Development of transflective LCD for high contrast and wide viewing angle by using homeotropic alignment", Asia Display / IDW '01, LCT8-3, pp. 133-136 (2001).

Communication from Japanese Patent Office regarding counterpart application.

* cited by examiner

LIQUID CRYSTAL DISPLAY DEVICE AND ELECTRONIC APPARATUS

RELATED APPLICATIONS

This application claims priority to Japanese Patent Application No. 2004-253845 filed Sep. 1, 2004 which is hereby expressly incorporated by reference herein in its entirety.

BACKGROUND OF THE INVENTION

1. Technical Field

The present invention relates to liquid crystal display devices and electronic apparatuses.

2. Related Art

As one type of liquid crystal display device in which a liquid crystal layer is interposed between a substrate on the side of the viewer (first substrate) and a substrate on the side of the a source (second substrate), transflective liquid crystal display devices capable of functioning both in a reflective mode and in a transmissive mode have been known. For example, a transflective liquid crystal display device has been proposed in which a reflection film is provided on the inner surface of the substrate on the side of the light source, the reflective film being composed of a metal film made of aluminum or the like and provided with an opening, and the reflection film is allowed to act as a transflector. In the reflective mode, external light incident on the substrate on the side of the viewer passes through the liquid crystal layer, is reflected from the reflection film provided on the inner surface of the substrate on the side of the light source, passes through the liquid crystal layer again, and is then emitted from the substrate on the side of the viewer, thus displaying an image. On the other hand, in the transmissive mode, light from a light source incident on the substrate on the side of the light source enters the liquid crystal layer through the opening in the reflection film, passes through the liquid crystal layer, and is then emitted from the substrate on the side of the viewer toward the viewer, thus displaying an image. Consequently, in the reflection film formation region, a region provided with the opening corresponds to a transmissive display region, and the other region corresponds to a reflective display region.

However, the transflective liquid crystal display device according to the related art has a problem in that a viewing angle is narrow in transmissive display. The reason for this is that since the transflector is provided on the inner surface of the liquid crystal cell in order to prevent the generation of parallax, reflective display must be performed using only one polarizer provided on the side of the viewer, and thus freedom in optical design is limited. In order to overcome this problem, M. Jisaki et al. have proposed a novel liquid crystal display device using vertical alignment liquid crystal in "Development of transflective LCD for high contrast and wide viewing angle by using homeotropic alignment", Asia Display/IDW'01, p. 133-136 (2001). This liquid crystal display device has the following three characteristics:

(1) A "vertical alignment (VA) mode" is employed in which liquid crystal having negative dielectric anisotropy is vertically aligned on a substrate, and the liquid crystal molecules are inclined by the application of a voltage.

(2) A "multigap structure" is employed in which the thickness (cell gap) of the liquid crystal layer in a transmissive display region is different from the thickness of the liquid crystal layer in a reflective display region, (refer to, for example, Japanese Unexamined Patent Application Publication No. 11-242226).

(3) A "multidomain alignment configuration" is employed in which the transmissive display region is divided into regular octagonal subdots, and a protrusion is formed at the center of each subdot in the transmissive display region on the substrate on the side of the viewer so that the liquid crystal molecules are radially inclined.

In the transflective liquid crystal display device, it is very effective to employ a multigap structure, as described in Japanese Unexamined Patent Application Publication No. 11-242226. The reason for this is that although incident light is transmitted through the liquid crystal layer only once in the transmissive display region, incident light is transmitted through the liquid crystal layer twice in the reflective display region, resulting in a difference in retardation (phase difference) between the transmissive display region and the reflective display region. By controlling the retardation by the multigap structure, the transmittance in the transmissive display region and the transmittance in the reflective display region are equalized, and thus a liquid crystal display device having excellent display quality can be obtained.

Furthermore, when the multidomain alignment configuration is not employed, liquid crystal molecules are inclined in random directions in the presence of an applied electric field, and discontinuous lines (disclinations) appear in the boundaries between the regions with different liquid crystal molecular orientations, resulting in a residual image or the like. Moreover, since the regions with different liquid crystal molecular orientations have different viewing angle characteristics, stain-like, rough unevenness may appear when viewed obliquely. In contrast, by employing the multidomain alignment configuration, it becomes possible to align the liquid crystal molecules in a predetermined direction in the presence of an applied electric field. Consequently, a liquid crystal display device having a wide viewing angle and excellent display quality can be obtained.

However, in a thickness adjustment layer for adjusting the thickness of the liquid crystal layer to produce the multigap structure, an inclined region is formed in the boundary between the transmissive display region and the reflective display region. In the inclined region, since liquid crystal molecules are aligned perpendicular to the alignment film provided on the surface, refractive index anisotropy is exhibited in a direction perpendicular to the substrate, resulting in a difference in retardation compared to other regions. As a result, in a black display, light leakage occurs in the inclined region, thus reducing the contrast.

In view of such a problem, according to Japanese Unexamined Patent Application Publication No. 11-242226, the inclined region of the thickness adjustment layer for adjusting the liquid crystal layer is covered with a reflection electrode composed of Al or the like to prevent light leakage in that region. However, when a connection between subdots is placed in the boundary between the transmissive display region and the reflective display region, it is not possible to cover the inclined region entirely with the reflection electrode, resulting in a reduction in contrast.

SUMMARY

An advantage of the invention is that it provides a liquid crystal display device in which the contrast is not reduced due to light leakage in an inclined region of a thickness adjustment layer for adjusting the thickness of the liquid crystal layer. Another advantage of the invention is that it provides an electronic apparatus having excellent display quality.

According to a first aspect of the invention, a liquid crystal display device includes a first substrate, a second substrate, and a liquid crystal layer interposed between the first substrate and the second substrate, the liquid crystal display device having a dot region as an image display unit, the dot region including a transmissive display region and a reflective display region, wherein a thickness adjustment layer for adjusting the thickness of the liquid crystal layer is disposed between the liquid crystal layer and at least one of the first substrate and the second substrate, the thickness adjustment layer decreasing the thickness of the liquid crystal layer in the reflective display region compared with the thickness of the liquid crystal layer in the transmissive display region, and a metal line is placed on the second substrate so as to overlap, in plan view, an inclined region of the thickness adjustment layer disposed between the transmissive display region and the reflective display region.

In such a structure, light entering from the second substrate toward the inclined region of the thickness adjustment layer is intercepted by the metal line placed on the second substrate. On the other hand, light entering the inclined region of the thickness adjustment layer from the first substrate passes through the liquid crystal layer and is specularly reflected from the surface of the metal line. However, the viewer observes the image of the liquid crystal display device while adjusting the viewing angle so as not to see the illuminating light specularly reflected. Consequently, it is possible to eliminate the inclined region of the thickness adjustment layer from the image display, and thus it is possible to prevent a reduction in contract due to light leakage.

It is preferable that the thickness adjustment layer be disposed on an end in the longitudinal direction of the dot region, and the inclined region of the thickness adjustment layer be formed parallel to the short side of the dot region. In such a structure, since the metal line can be linearly formed, the resistivity of the metal line can be decreased and reliability can be improved.

It is preferable that the thickness adjustment layer be disposed on the first substrate, and the width of the metal line be larger than the width of the inclined region of the thickness adjustment layer. In such a structure, even if the relative position is deviated when the first substrate and the second substrate are bonded to each other, the inclined region of the thickness adjustment layer is allowed to overlap the metal line in plan view. Consequently, it is possible to securely prevent a reduction in contrast due to light leakage.

Alternatively, it is preferable that the thickness adjustment layer be disposed on the second substrate. In such a structure, misalignment between the inclined region of the thickness adjustment layer and the metal line does not occur resulting from bonding between the first substrate and the second substrate. Consequently, it is possible to securely prevent a reduction in contrast due to light leakage.

It is preferable that the metal line be a scanning line connected to a switching element in the dot region. The metal line may be a capacitor line constituting a storage capacitor in the dot region. By using the scanning line or the capacitor line aligned parallel to the short side of the dot region as the metal line, the structure according to an embodiment of the invention can be produced at low cost.

According to a second aspect of the invention, an electronic apparatus includes any one of the liquid crystal display devices described above. In such a structure, it is possible to provide an electronic apparatus having excellent display quality.

BRIEF DESCRIPTION OF THE DRAWINGS

The invention will be described with reference to the accompanying drawings, wherein like numbers reference like elements, and wherein.

DESCRIPTION OF THE EMBODIMENTS

Embodiments of the invention will be described below with reference to the drawings. In the drawings, the scale for each element is varied appropriately so that the element is of a recognizable size. Note that in this specification, with respect to each element constituting the liquid crystal display device, the liquid crystal layer side is referred to as an inner side and the opposite side is referred to as an outer side. Furthermore, the terms "when an unselected voltage is applied" and "when a selected voltage is applied" respectively mean that "when the voltage applied to the liquid crystal layer is in the vicinity of the threshold voltage of the liquid crystal" and "when the voltage applied to the liquid crystal layer is sufficiently higher than the threshold voltage of the liquid crystal layer".

First Embodiment

A liquid crystal display device according to a first embodiment of the invention will be described with reference to FIGS. 1 to 3. As shown in FIG. 3, a liquid crystal display device according to the first embodiment is a transflective liquid crystal display device including a substrate (second substrate) 10 on the side of a light source, a substrate (first substrate) 20 on the side of the viewer, and a liquid crystal layer 50 interposed between the first substrate 20 and the second substrate 10, the liquid crystal display device having a dot region as an image display unit, the dot region including a transmissive display region T and a reflective display region R. A thickness adjustment layer 40 for adjusting the thickness of the liquid crystal layer is provided on the substrate 20 in the reflective display region R, and a gate line 3a is placed on the substrate 10 so as to overlap, in plan view, an inclined region 41 of the thickness adjustment layer 40 disposed between the transmissive display region T and the reflective display region R. In this embodiment, an example of an active matrix liquid crystal display device in which thin-film transistors (hereinafter referred to as "TFTs") are used as switching elements will be described. Furthermore, an example in which the liquid crystal layer 50 is composed of a liquid crystal material having negative dielectric anisotropy will be described.

(Equivalent Circuit)

Figure 1:
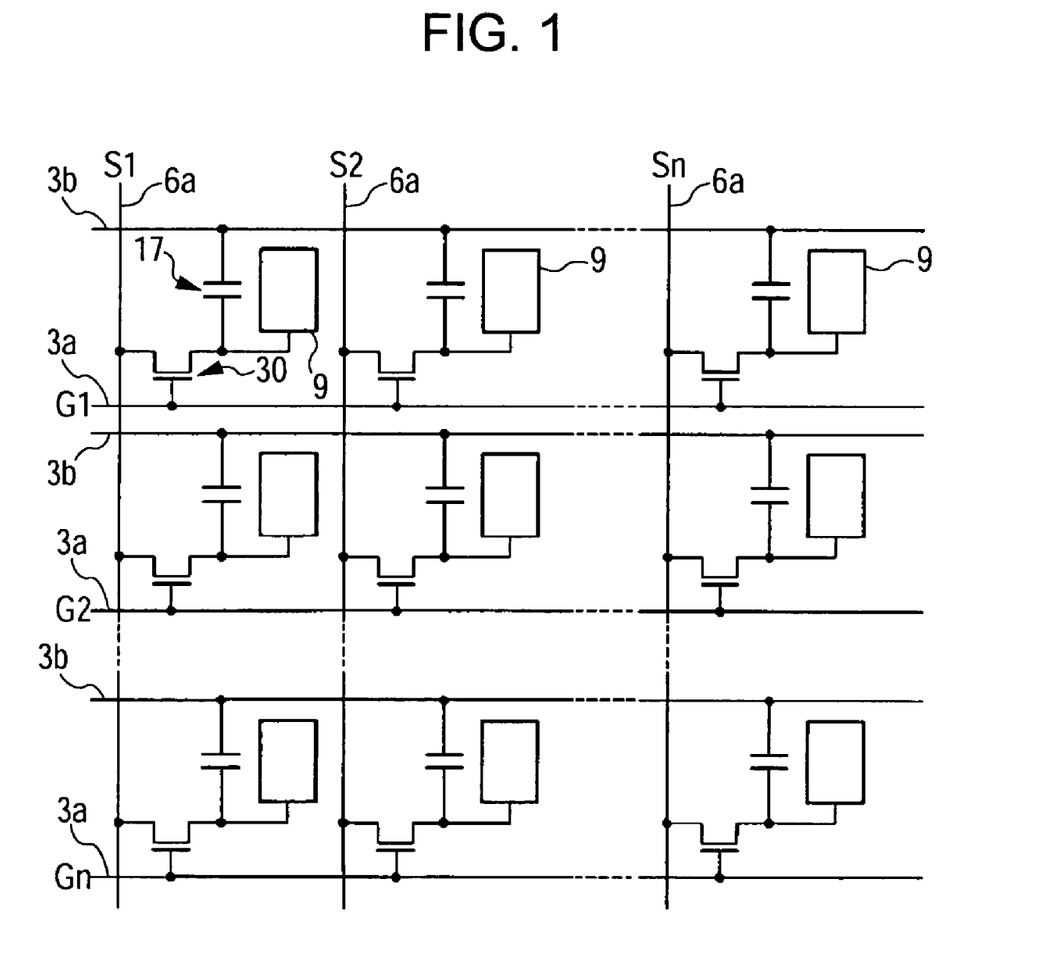
FIG. 1 is an equivalent circuit diagram of a liquid crystal display device.

FIG. 1 is an equivalent circuit diagram of the liquid crystal display device. In the image display area of the liquid crystal display device, data lines 6a and gate lines 3a are arranged like a grid, and a dot region, which constitutes an image display unit, is placed in the vicinity of each of the intersections between the data lines 6a and the gate lines 3a. A pixel electrode 9 is disposed in each of a plurality of dot regions arranged in a matrix. A TFT element 30, which is a switching element for controlling current supply to the pixel electrode 9, is disposed beside the pixel electrode 9. A data line 6a is electrically connected to a source of the TFT element 30. Image signals S1, S2, ..., Sn are supplied to the data lines 6a. The image signals S1, S2, ..., Sn may be supplied to the data lines 6a in that order line by line, or the image signals may be supplied to a plurality of data lines 6a adjacent to each other group by group.

A gate line (scanning line) 3a is electrically connected to a gate of the TFT element 30. Scanning signals G1, G2, ..., Gn are supplied to the gate lines 3a at a predetermined timing in a pulsed form. Additionally, the scanning signals G1, G2, ..., Gn are applied to the gate lines 3a in that order line by line. The pixel electrode 9 is electrically connected to a drain of the TFT element 30. When the TFT elements 30, which are switching elements, are turned on for a certain period by the scanning signals G1, G2, ..., Gn, the image signals S1, S2, ..., Sn supplied from the data lines 6a are written into the liquid crystal in the respective pixels at a predetermined timing.

The image signals S1, S2, ..., Sn written at a predetermined level into the liquid crystal are retained for a certain period in liquid crystal capacitors formed between the pixel electrodes 9 and a common electrode, which will be described below. Additionally, in order to prevent the retained image signals S1, S2, ..., Sn from leaking, storage capacitors 17 are formed between the pixel electrodes 9 and the capacitor lines 3b and placed parallel to the liquid crystal capacitors. When a voltage signal is applied to the liquid crystal as described above, the alignment of the liquid crystal molecules changes according to the level of the voltage applied. Thus, light entering the liquid crystal is modulated, enabling a grayscale display.

(Planar Structure)

Figure 2:
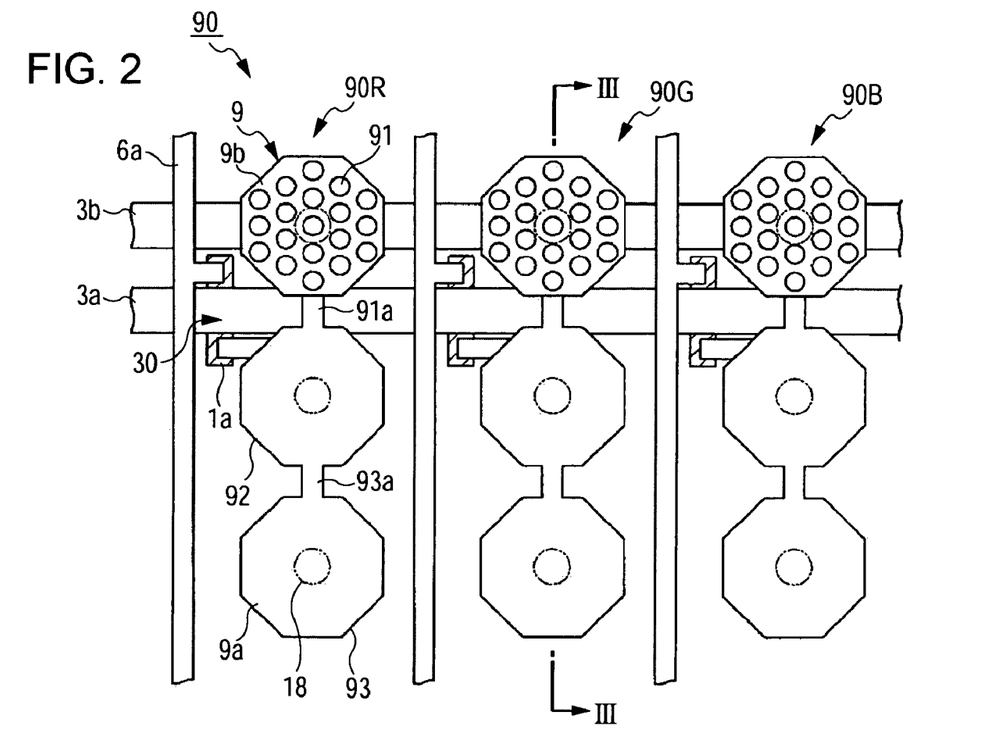
FIG. 2 is a schematic diagram showing a planar structure of a pixel.
Figure 3:
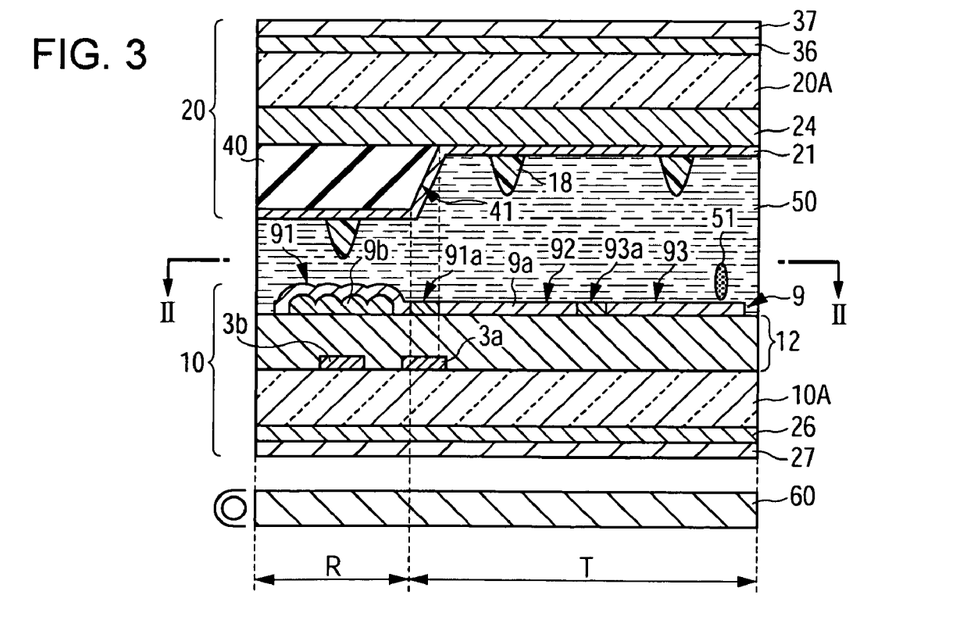
FIG. 3 is a sectional side elevation of a liquid crystal display device according to a first embodiment of the invention.

FIG. 2 is a schematic diagram showing a planar structure of a pixel and a sectional plan view taken along the line II-II of FIG. 3. As described above, in the active matrix liquid crystal display device, the region in which the pixel electrode 9 is formed corresponds to the image display unit. Consequently, the dot region serving as the image display unit corresponds to the region in which the pixel electrode 9 is formed. Furthermore, the liquid crystal display device includes color filters of three primary colors to form dots 90R, 90G, and 90B serving as image display units for three RGB primary colors. Each pixel 90 includes three dots 90R, 90G, and 90B.

The pixel electrode 9 includes a plurality of subdots. In the example shown in FIG. 2, a first subdot 91, a second subdot 92, and a third subdot 93 are aligned in the longitudinal direction in the dot region to constitute the pixel electrode 9. The first subdot 91 is composed of a reflection electrode 9b made of a metal film. The second subdot 92 and the third subdot 93 are each composed of a transparent electrode 9a made of a transparent conductive film. The transparent conductive film is also placed on the surface of the reflection electrode 9b constituting the first subdot 91 and at connections 91a and 93a between the subdots. Thus, the individual subdots are conductively connected to each other as if being skewered together. Each subdot is circular, polygonal (regular octagonal in this embodiment), or the like in plan view. When current is applied to the pixel electrode 9, the liquid crystal molecules aligned perpendicular to the surface of the pixel electrode 9 are realigned parallel to the surface of the pixel electrode 9. At this stage, the liquid crystal molecules are inclined radially from the periphery to the center of the subdot. Since the liquid crystal molecules can be made to have a plurality of directors, it is possible to provide a liquid crystal display device having a wide viewing angle.

Data lines 6a, gate lines 3a, and capacitor lines 3b, each composed of a metal, such as Al, are placed so as to allow the adjacent dot regions to communicate with each other. A semiconductor layer 1a is disposed beside the space between the first subdot 91 and the second subdot 92. The gate line 3a is placed on the surface of the semiconductor layer 1a, and the data line 6a and the pixel electrode 9 are connected to the semiconductor layer 1a, thus forming the TFT element 30. Alternatively, the TFT element 30 may be placed on the outer side of the reflection electrode constituting the first subdot 91. In such a case, the reflection electrode is allowed to serve as a light-shielding film for the TFT element, and the aperture ratio can also be improved.

(Cross-sectional Structure)

FIG. 3 is a sectional side elevation taken along the line III-III of FIG. 2. As shown in FIG. 3, the liquid crystal display device according to this embodiment includes, as major elements, the substrate 10 on the side of the light source and the substrate 20 on the side of the viewer which are opposed to each other. The liquid crystal layer 50 is interposed between the substrates 10 and 20.

The substrate 10 on the side of the light source includes a substrate body 10A composed of a transmissive material, such as glass, plastic, or quartz. An element section 12 is placed on the inner side (upper side in the drawing) of the substrate body 10A. In the element section 12, in addition to the TFT element (not shown) described above, various lines, such as the gate line 3a and the capacitor line 3b, are disposed. In FIG. 3, in order to facilitate understanding, lines other than the gate line 3a and the capacitor line 3b, interlayer insulating films, etc. are not shown.

The pixel electrode 9 is disposed on the inner side of the element section 12. The pixel electrode 9 includes the transparent electrode 9a and the reflection electrode 9b. The first subdot 91 placed on one end of the pixel electrode 9 is composed of the reflection electrode 9b. The reflection electrode 9b is formed by placing a metal film made of Al, Ag, or the like having high reflectance on the surface of an acrylic resin film or the like (not shown). Unevenness is formed on the surface of the metal film following the unevenness formed on the surface of he resin film. Thereby, the reflection electrode 9b can diffuse-reflect incident light.

On the other hand, the second subdot 92 and the third subdot 93 are each composed of the transparent electrode 9a. The transparent electrode 9a is made of a transparent conductive film composed of indium tin oxide (ITO), indium zinc oxide, such as IZO (registered trademark; manufactured by Idemitsu Kosan Co., Ltd.). The transparent conductive film is also placed on the surface of the reflection electrode 9b constituting the first subdot 91 and at the connections 91a and 93a between the subdots. Thus, the subdots 91, 92, and 93 constituting the pixel electrode 9 are conductively connected to each other. The region in which the reflection electrode 9b is formed corresponds to a reflective display region R, and the region in which the transparent electrode 9a is formed corresponds to a transmissive display region T.

On the other hand, the substrate 20 on the side of the viewer includes a substrate body 20A composed of a transmissive material, such as glass, plastic, or quartz. A color filter layer 24 is disposed on the inner side (lower side in the drawing) of the substrate body 20A. In the color filter layer 24, color filters transmitting any one of three RGB primary colors are periodically arrayed so as to correspond to the individual dot regions.

Furthermore, the thickness adjustment layer 40 composed of an electrical insulating material, such as an acrylic resin, is disposed on the inner side of the color filter layer 24. The thickness adjustment layer 40 is disposed in the reflective display region R, and the thickness of the thickness adjustment layer 40 is set, for example, at about 0.5 to 2.5 μm. By using the thickness adjustment layer 40, the thickness of the liquid crystal layer 50 in the reflective display region R is set at about a half of the thickness of the liquid crystal layer 50 in the transmissive display region T. Thus, a multigap structure is produced. Furthermore, an inclined region 41 is disposed in the boundary between the reflective display region R and the transmissive display region T. Consequently, the thickness of the liquid crystal layer 50 continuously changes from the reflective display region R to the transmissive display region T. The angle of inclination of the inclined region 41 is usually set at about 10° to 30°.

Furthermore, a common electrode 21 composed of a transparent conductive material, such as ITO, is disposed over the entire inner surface of the substrate 20 on the side of the viewer extending from the inner side of the color filer layer 24 to the inner side of the thickness adjustment layer 40. Although not shown in the drawing, alignment films composed of a polyimide or the like are disposed on the surface of the pixel electrode 9 in the substrate 10 on the side of the light source and the surfaces of the common electrode 21 and the protrusions 18 in the substrate 20 on the side of the viewer. The alignment films are used to vertically align the liquid crystal molecules with respect to the surfaces thereof and are not subjected to rubbing treatment or the like to produce pretilt angles.

Moreover, protrusions 18 composed of a dielectric material, such as a resin, are disposed on the inner side of the common electrode 21. The protrusions 18 are each formed into a cone, frustum, hemisphere, or the like, for example, by photolithography. The protrusions 18 are placed at positions corresponding to the centers of the subdots 91, 92, and 93 of the pixel electrode 9 disposed on the substrate 10 on the side of the light source (refer to FIG. 2).

When an electric field is applied between the pixel electrode 9 and the common electrode 21 which are shown in FIG. 3, the liquid crystal molecules aligned perpendicular to the surface of the protrusions 18 are realigned parallel to the surface of the common electrode 21. At this stage, the liquid crystal molecules are inclined radially to each of the protrusions 18 serving as the centers. Consequently, the liquid crystal molecules can be made to have a plurality of directors, and it is possible to provide a liquid crystal display device having a wide viewing angle. Besides the protrusions 18, in order to control alignment, slits may be formed in the common electrode 21.

On the other hand, the liquid crystal layer 50 composed of a liquid crystal material having negative dielectric anisotropy is interposed between the substrate 10 on the side of the light source and the substrate 20 on the side of the viewer. As schematically shown by a liquid crystal molecule 51, this liquid crystal material is aligned perpendicular to the surface of the alignment film in the absence of an applied electric field, and is aligned parallel to the surface of the alignment film (i.e., perpendicular to the electric field direction) in the presence of an applied electric field. Furthermore, the substrate 10 on the side of the light source and the substrate 20 on the side of the viewer are bonded to each other with a sealant (not shown) applied on the peripheries of the substrate 10 and the substrate 20, and the liquid crystal is enclosed in the space formed by the substrate 10, the substrate 20, and the sealant. Furthermore, the thickness (cell gap) of the liquid crystal layer 50 is regulated by allowing the photo spacers (not shown) arranged in a standing condition on one of the substrate to abut on the other substrate.

A retardation film 26 and a polarizer 27 are provided on the outer side of the substrate 10 on the side of the light source, and a retardation film 36 and a polarizer 37 are provided on the outer side of the substrate 20 on the side of the viewer. The polarizers 27 and 37 each have a function of transmitting only linearly polarized light oscillating in a predetermined direction. As the retardation films 26 and 36, quarter-wave plates having a phase difference of substantially a quarter wavelength with respect to the wavelength of visible light are used. The transmission axis of the polarizer 27 or 37 and the slow axis of the retardation film 26 or 36 are arranged at an angle of about 45°, and the polarizer 27 or 37 and the retardation film 26 or 36 constitute a circular polarizer. Linearly polarized light is converted to circularly polarized light and circularly polarized light is converted to linearly polarized light by the circular polarizer. Furthermore, the transmission axis of the polarizer 27 and the transmission axis of the polarizer 37 are arranged so as to be orthogonal to each other, and the slow axis of the retardation film 26 and the slow axis of the retardation film 36 are arranged so as to be orthogonal to each other. Furthermore, a backlight (illumination unit) 60 including a light source, a reflector, an optical waveguide, etc., is provided on the outer side of the polarizer 27 in the substrate 10 on the side of the light source.

In the transflective liquid crystal display device shown in FIG. 3, an image is displayed in a manner described below. First, light entering the reflective display region R from above the substrate 20 on the side of the viewer passes through the polarizer 37 and the retardation film 36 to be converted to circularly polarized light, and the circularly polarized light enters the liquid crystal layer 50. Since the liquid crystal molecules aligned perpendicular to the substrate in the absence of an applied electric field do not have refractive index anisotropy, the incident light passes through the liquid crystal layer 50 with circular polarization being maintained. Furthermore, the incident light which is reflected from the reflection electrode 9b and transmitted through the retardation film 36 again is converted to linearly polarized light that is orthogonal to the transmission axis of the polarizer 37. The linearly polarized light does not pass through the polarizer 37. On the other hand, light entering the transmissive display region T from the backlight 60 similarly passes through the polarizer 27 and the retardation film 26 to be converted to circularly polarized light, and the circularly polarized light enters the liquid crystal layer 50. Furthermore, the incident light which is transmitted through the retardation film 36 is converted to linearly polarized light that is orthogonal to the transmission axis of the polarizer 37. Since the linearly polarized light does not pass through the polarizer 37, a black display is performed in the absence of an applied electric field (normally black mode) in the liquid crystal display device according to this embodiment.

On the other hand, when an electric field is applied to the liquid crystal layer 50, the liquid crystal molecules are realigned parallel to the substrate so as to have refractive index anisotropy. Consequently, circularly polarized light entering the liquid crystal layer 50 in the reflective display region R and the transmissive display region T is converted to elliptically polarized light while being transmitted through the liquid crystal layer 50. Even if this incident light passes through the retardation film 36, it is not converted to linearly polarized light that is orthogonal to the transmission axis of the polarizer 37 and is entirely or partially transmitted through the polarizer 37. Consequently, a white display is performed in the presence of an applied electric field in the liquid crystal display device according to this embodiment. Additionally, by controlling the voltage applied to the liquid crystal layer 50, it is also possible to perform a grayscale display.

As described above, incident light passes through the liquid crystal layer 50 twice in the reflective display region R, whereas incident light passes through the liquid crystal layer 50 only once in the transmissive display region T. In such a case, if there is a difference in the retardation (phase difference) of the liquid crystal layer 50 between the reflective display region R and the transmissive display region T, it becomes not possible to obtain a uniform image display due to a difference in transmittance. However, since the liquid crystal display device according to this embodiment includes the thickness adjustment layer 40, it is possible to control the retardation in the reflective display region R. Consequently, it is possible to obtain a uniform image display in the reflective display region R and the transmissive display region T.

(Placement of Gate Line)

As described above, the inclined region 41 of the thickness adjustment layer 40 is disposed in the boundary between the reflective display region R and the transmissive display region T. Since the alignment film is also formed on the surface of the inclined region 41, the liquid crystal molecules are aligned perpendicular to the surface of the inclined region 41 in the absence of an applied electric field. In such a case, the liquid crystal molecules exhibit refractive index anisotropy with respect to light perpendicularly entering from the substrate. Therefore, circularly polarized light entering the inclined region 41 is converted to elliptically polarized light while being transmitted through the liquid crystal layer 50 and is entirely or partially transmitted through the polarizer 37. Consequently, light leakage occurs in the inclined region 41 in the black display in the absence of an applied electric field, resulting in a decrease in contrast.

Accordingly, in this embodiment, the gate line 3a is placed so as to overlap, in plan view, the inclined region 41 of the thickness adjustment layer 40. In the liquid crystal display device according to the related art, the gate line is placed in the periphery of the dot region to ensure the aperture ratio. However, in this embodiment, the gate line is disposed inside the dot region to prevent light leakage in the inclined region 41. As shown in FIG. 2, each of the dots 90R, 90G, 90B has an elongated shape with long sides that extend in a lengthwise direction and short sides that extend in a widthwise direction. The reflective display region R is located at one longitudinal end of the dot region and the inclined region 41 of the thickness adjustment layer 40 is aligned parallel to a short side of the dot region. Furthermore, the adjacent dot regions are similarly arranged. Therefore, the placement of the gate lines 3a according to this embodiment can be achieved by translating the gate lines which have been placed in the peripheries of the dot regions according to the related art.

The gate line 3a is composed of a metal, such as Al. Therefore, light entering from the substrate 10 toward the inclined region 41 of the thickness adjustment layer 40 is intercepted by the gate line 3a placed on the substrate 10. On the other hand, light entering the inclined region 41 from the substrate 20 passes through the liquid crystal layer and is specularly reflected form the surface of the gate line 3a. However, the viewer usually observes the image of the liquid crystal display device while adjusting the viewing angle so as not to see the illuminating light specularly reflected. Consequently, it is possible to eliminate the inclined region 41 from the image display, and thus it is possible to prevent a reduction in contrast due to light leakage.

The gate line 3a is formed with a wider width than the inclined region 41 of the thickness adjustment layer 40. (In FIG. 2, the "widths" of the gate line 3a and the inclined region 41 are the dimensions extending in the vertical direction of FIG. 2.) Consequently, even if the relative position is deviated when the substrate 10 and the substrate 20 are bonded to each other, the inclined region 41 is allowed to overlap the gate line 3a in plan view. Therefore, it is possible to securely prevent a reduction in contrast due to light leakage.

Second Embodiment

Figure 4:
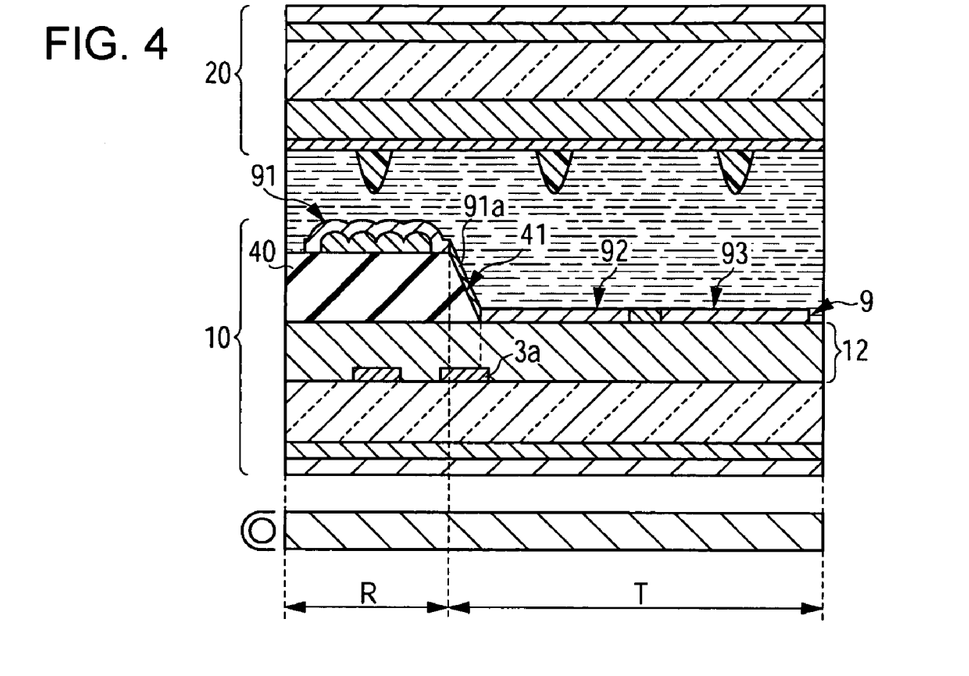
FIG. 4 is a sectional side elevation of a liquid crystal display device according to a second embodiment of the invention.

A liquid crystal display device according to a second embodiment of the invention will be described with reference to FIG. 4. FIG. 4 is a sectional side elevation of the liquid crystal display device according to the second embodiment of the invention. The liquid crystal display device according to the second embodiment differs from the first embodiment in that the thickness adjustment layer 40 is disposed on the substrate 10 on the side of the light source. The same elements as those in the first embodiment are represented by the same reference numerals and a detailed description thereof will be omitted.

In the second embodiment, the reflective display region R is also set at one end in the longitudinal direction of the dot region. However, the thickness adjustment layer 40 is disposed on the substrate 10 on the side of the light source, not on the substrate 20 on the side of the viewer. The first subdot 91 is placed on the surface of the thickness adjustment layer 40, and the connection 91a between the first subdot 91 and the second subdot 92 is placed on the surface of the inclined region 41 of the thickness adjustment layer 40.

The gate line 3a is placed so as to overlap, in plan view, the inclined region 41 of the thickness adjustment layer 40. Consequently, as in the first embodiment, the inclined region 41 can be eliminated from the image display, and thus it is possible to prevent a reduction in contrast due to light leakage. In addition to this, in the second embodiment, since the inclined region 41 of the thickness adjustment layer 40 and the gate line 3a are disposed on the substrate 10 on the side of the light source, misalignment between the inclined region 41 and the gate line 3a does not occur resulting from bonding between the substrate 20 and the substrate 10, and both are always allowed to overlap each other in plan view. Consequently, it is possible to securely prevent a reduction in contrast due to light leakage.

Third Embodiment

Figure 5:
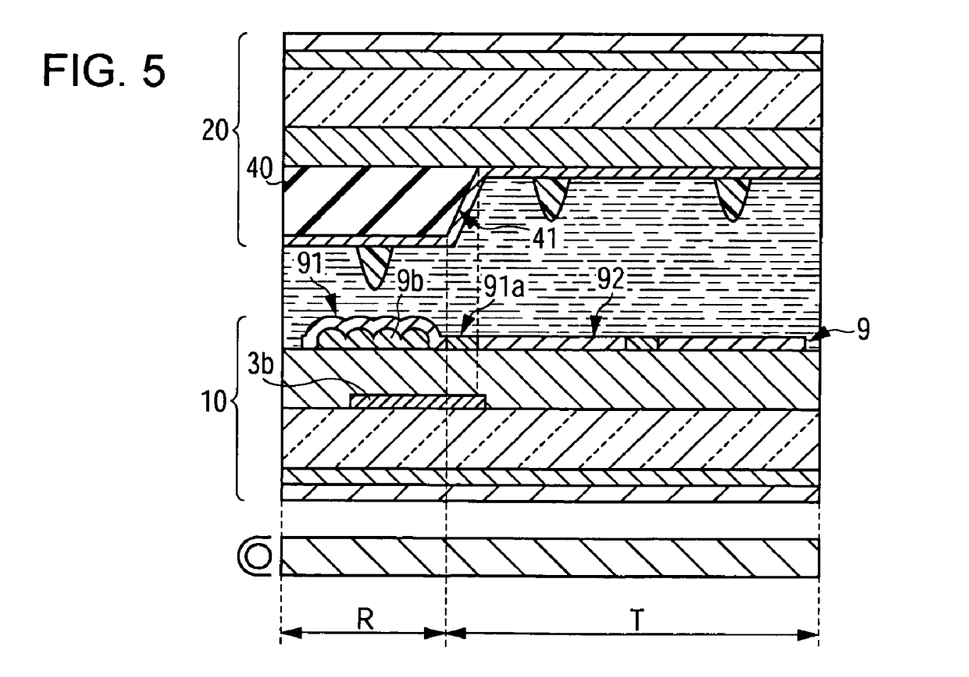
FIG. 5 is a sectional side elevation of a liquid crystal display device according to a third embodiment of the invention.

A liquid crystal display device according to a third embodiment of the invention will be described with reference to FIG. 5. FIG. 5 is a sectional side elevation of the liquid crystal display device according to the third embodiment of the invention. The liquid crystal display device according to the third embodiment differs from the first embodiment in that a capacitor line 3b, instead of the gate line, is disposed so as to overlap, in plan view, the inclined region 41 of the thickness adjustment layer 40. The same elements as those in the first embodiment are represented by the same reference numerals and a detailed description thereof will be omitted.

A storage capacitor is formed between the capacitor line 3b and the pixel electrode 9. The capacitor line 3b is usually disposed on the outer side (lower side in FIG. 5) of the reflective electrode 9b constituting the first subdot 91, and thus a decrease in the aperture ratio is prevented. In the third embodiment, the capacitor line 3b extends from the outer side of the first subdot 91 to the outer side of the connection 91a and is disposed so as to overlap, in plan view, the inclined region 41 of the thickness adjustment layer 40. Additionally, since the gate line is placed in the periphery of the dot region as in the related art, the gate line is not shown in FIG. 5.

If the capacitor line 3b is placed as described above, the capacitor line 3b is allowed to function as the capacitor line as in the related art and the capacitor line 3b can also intercept light entering from the substrate 10 toward the inclined region 41 of the thickness adjustment layer 40. Furthermore, the capacitor line 3b specularly reflects light entering the inclined region 41 from the substrate 20, and the inclined region 41 can be eliminated from the image display, and thus it is possible to prevent a reduction in contrast due to light leakage.

Preferably, the capacitor line 3b extends from the outer side of the first subdot 91 through the outer side of the connection 91a to the outer side of the edge of the second subdot 92. In such a structure, even if the relative position is deviated when the substrate 10 on the side of the light source and the substrate 20 on the side of the viewer are bonded to each other, the inclined region 41 is allowed to overlap the capacitor line 3b in plan view. Consequently, it is possible to securely prevent a reduction in contrast due to light leakage.

Fourth Embodiment

Figure 6:
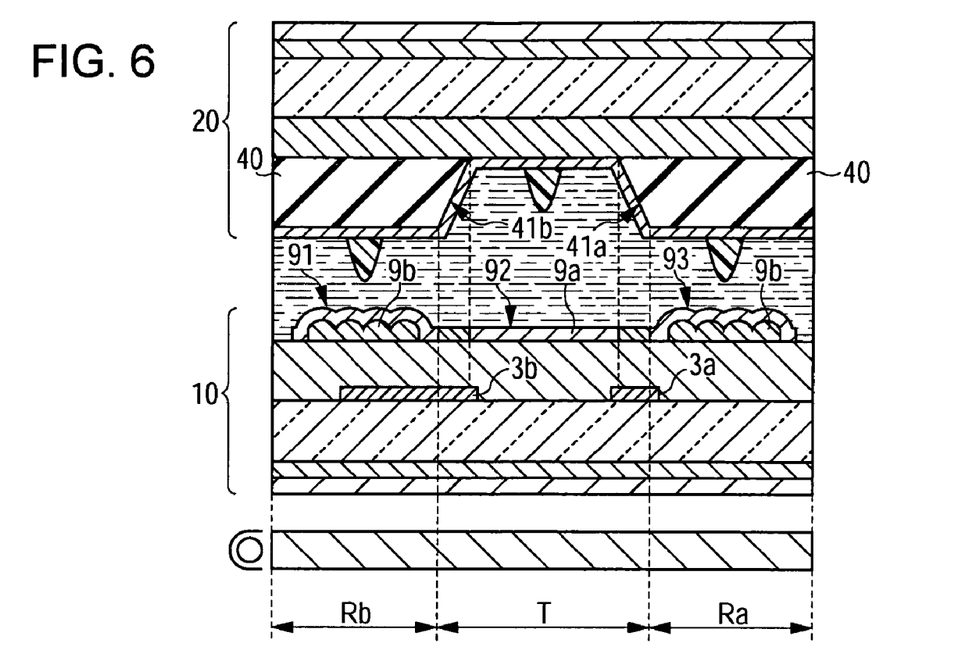
FIG. 6 is a sectional side elevation of a liquid crystal display device according to a fourth embodiment of the invention.

A liquid crystal display device according to a fourth embodiment of the invention will be described with reference to FIG. 6. FIG. 6 is a sectional side elevation of the liquid crystal display device according to the fourth embodiment of the invention. The liquid crystal display device according to the fourth embodiment differs from the first embodiment in that reflective display regions Ra and Rb are set at both ends in the longitudinal direction of the dot region, a gate line 3a is placed so as to overlap, in plan view, a first inclined region 41a of the thickness adjustment layer 40, and a capacitor line 3b is placed so as to overlap a second inclined region 41b in plan view. The same elements as those in the first and third embodiments are represented by the same reference numerals and a detailed description thereof will be omitted.

In the fourth embodiment, the reflective display regions Ra and Rb are set on both ends in the longitudinal direction of the dot region, and a transmissive display region T is set in the central part in the longitudinal direction. Accordingly, thickness adjustment layers 40 for adjusting the thickness of the liquid crystal layer are disposed on both ends in the longitudinal direction of the substrate 20 on the side of the viewer in the dot region. Furthermore, the first inclined region 41a of the thickness adjustment layer 40 is disposed in the boundary between the reflective display region Ra and the transmissive display region T, and the second inclined region 41b of the thickness adjustment layer 40 is disposed in the boundary between the reflective display region Rb and the transmissive display region T. In this embodiment, since the reflective display regions Ra and Rb are set on both ends in the dot region, the first inclined region 41a and the second inclined region 41b are aligned parallel to the short side of the dot region. With respect to the pixel electrode 9, the first subdot 91 and the third subdot 93 are composed of reflection electrodes 9b and the second subdot 92 is composed of the transparent electrode 9a.

The gate line 3a is placed so as to overlap, in plan view, the first inclined region 41a of the thickness adjustment layer 40. The capacitor line 3b extends so as to overlap, in plan view, the second inclined region 41b of the thickness adjustment layer 40. In such a structure, even if the first inclined region 41a and the second inclined region 41b are disposed, both can be eliminated from the image display, and thus it is possible to prevent a reduction in contrast.

[Electronic Apparatuses]

Figure 7:
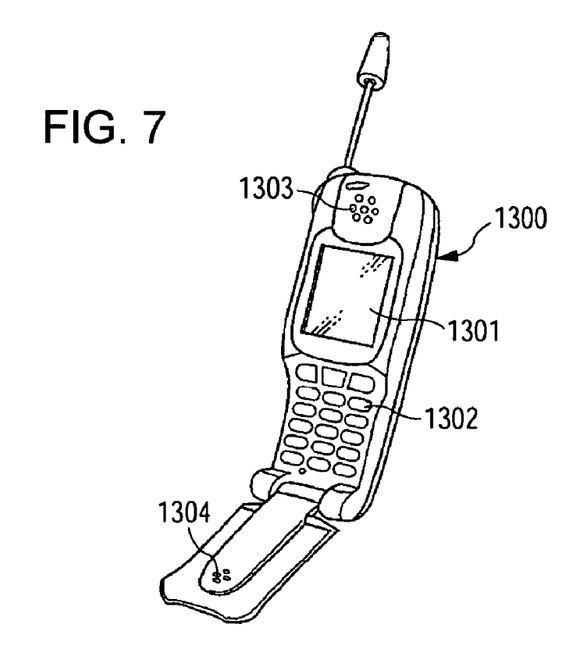
FIG. 7 is a perspective view of a mobile phone.

FIG. 7 is a perspective view showing an example of an electronic apparatus according to an embodiment of the invention. A mobile phone shown in FIG. 7 includes a small display unit 1301 which corresponds to a display device according to an embodiment of the invention, a plurality of operation buttons 1302, an earpiece 1303, and a mouthpiece 1304.

Besides the mobile phone, the display devices according to the embodiments described above can be suitably used as image-displaying units for various types of electronic apparatuses, such as electronic books, persona computers, digital still cameras, liquid crystal televisions, viewfinder type or monitor-direct-view type video tape recorders, car navigation systems, pagers, electronic pocket diaries, desktop electronic calculators, word processors, workstations, television telephones, POS terminals, and apparatuses provided with touch panels, in which bright, high-contrast, and wide-viewing-angle displays are enabled.

The technical field of the invention is not limited to the embodiments described above. It is to be understood that the invention is intended to embrace all such alternatives, modification, and variations as may fall within the spirit and scope of the appended claims and the specification. That is, the specific materials and structures described in the embodiments are only examples, and changes can be made appropriately.

For example, in the embodiments, examples in which TFT elements are used as switching elements are described. However, it is also possible to apply the invention to cases in which other switching elements, such as TFD elements, are used. Furthermore, in the embodiments, examples of liquid crystal display devices which operate on the vertical alignment nematic (VAN) mode using liquid crystal materials exhibiting negative dielectric anisotropy are described. However, it is also possible to apply the invention to liquid crystal display devices which operate on the twisted nematic (TN) mode using liquid crystal materials exhibiting positive dielectric anisotropy, and liquid crystal display devices which operate on the super twisted nematic (STN) mode, the electrically controlled birefringence (ECB) mode, or the like.

The entire disclosure of Japanese Patent Application No. 2004-253845, filed Sep. 1, 2004, is expressly incorporated by reference herein.

What is claimed is:

1. A liquid crystal display device comprising:
a first substrate;
a second substrate;
a liquid crystal layer interposed between the first substrate and the second substrate;
a first dot region including a transmissive display region and a reflective display region, the first dot region including two long edges and two short edges, the long edges each being longer than each of the short edges;

a second dot region;

a thickness adjustment layer disposed between the liquid crystal layer and at least one of the first substrate and the second substrate, the thickness adjustment layer decreasing the thickness of the liquid crystal layer in the reflective display region compared with the thickness of the liquid crystal layer in the transmissive display region, the thickness adjustment layer having an inclined region disposed at a position in between and separated at a distance from the short edges of the first dot region; and a metal signal line that supplies signals to the first and second dot regions, the metal signal line being disposed over the second substrate, the metal signal line extending across both of the long edges of the first dot region at the position in between and separated from the short edges of the first dot region so as to overlap, in plan view, the inclined region of the thickness adjustment layer.

2. The liquid crystal display device according to claim 1, wherein the thickness adjustment layer is disposed at a longitudinal end of the first dot region, the inclined region of the thickness adjustment layer being formed in parallel with a short side of the first dot region.

3. The liquid crystal display device according to claim 1, wherein the thickness adjustment layer is disposed on the first substrate, the metal signal line having a wider width than the inclined region of the thickness adjustment layer.

4. The liquid crystal display device according to claim 1, wherein the metal signal line is a scanning line connected to a switching element in the first dot region.

5. An electronic apparatus comprising the liquid crystal display device according to claim 1.

6. A liquid crystal display device comprising:

a first substrate;

a second substrate;

a liquid crystal layer interposed between the first substrate and the second substrate;

a dot region including a transmissive display region and a reflective display region, the dot region including a plurality of long edges and a plurality of short edges, the long edges each being longer than each of the short edges;

a thickness adjustment layer disposed between the liquid crystal layer and at least one of the first substrate and the second substrate, the thickness adjustment layer decreasing the thickness of the liquid crystal layer in the reflective display region compared with the thickness of the liquid crystal layer in the transmissive display region, the thickness adjustment layer having an inclined region disposed at a position in between and separated at a distance from the short edges of the dot region; and a metal line disposed on the second substrate, the metal line extending across each of the plurality of long edges of the dot region at the position in between and separated at a distance from the short edges of the dot region so as to overlap, in plan view, the inclined region of the thickness adjustment layer;

wherein the dot region includes a plurality of subdots that are substantially aligned in a longitudinal direction, wherein the subdots are separated at a distance, wherein a connection extends substantially parallel to the longitudinal direction between each pair of subdots, wherein the subdots have a width that is greater than the width of the connections, and wherein the metal line also overlaps at least one of the connections.

7. A liquid crystal display device comprising:

a first substrate;

a second substrate;

a liquid crystal layer interposed between the first substrate and the second substrate;

a dot region including a transmissive display region and a reflective display region, the dot region including a plurality of long edges and a plurality of short edges, the long edges each being longer than each of the short edges;

a thickness adjustment layer disposed between the liquid crystal layer and at least one of the first substrate and the second substrate, the thickness adjustment layer decreasing the thickness of the liquid crystal layer in the reflective display region compared with the thickness of the liquid crystal layer in the transmissive display region, the thickness adjustment layer having an inclined region disposed at a position in between and separated at a distance from the short edges of the dot region; and a metal line disposed on the second substrate, the metal line extending across each of the plurality of long edges of the dot region at the position in between and separated at a distance from the short edges of the dot region so as to overlap, in plan view, the inclined region of the thickness adjustment layer;

wherein the dot region includes a plurality of subdots and a connection that extends between and electrically connects the plurality of subdots, the connection having a width, in plan view, that is substantially equal to a width of the inclined region, and wherein the metal line overlaps both the connection and the inclined region, in plan view.

* * * * *